Nov. 24, 1942.                A. L. WALTON                2,302,821
              COIN-FREED AMUSEMENT OR VENDING MACHINES
                       Filed June 5, 1940            9 Sheets-Sheet 1

INVENTOR:
ALFRED LEONARD WALTON
BY
Haseltine, Lake & Co.
ATTORNEYS.

Nov. 24, 1942. A. L. WALTON 2,302,821
COIN-FREED AMUSEMENT OR VENDING MACHINES
Filed June 5, 1940 9 Sheets-Sheet 2

INVENTOR:
ALFRED LEONARD WALTON
BY
Haseltine, Lake & Co.
ATTORNEYS

Nov. 24, 1942.     A. L. WALTON     2,302,821
COIN-FREED AMUSEMENT OR VENDING MACHINES
Filed June 5, 1940     9 Sheets-Sheet 4

Fig. 5.

INVENTOR:
ALFRED LEONARD WALTON
BY Haseltine Lake & Co.
ATTORNEYS

Nov. 24, 1942.  A. L. WALTON  2,302,821
COIN-FREED AMUSEMENT OR VENDING MACHINES
Filed June 5, 1940  9 Sheets-Sheet 9

INVENTOR:
ALFRED LEONARD WALTON
BY
Haseltine, Lake & Co.
ATTORNEYS.

Patented Nov. 24, 1942

2,302,821

UNITED STATES PATENT OFFICE 2,302,821

COIN-FREED AMUSEMENT OR VENDING MACHINE

Alfred Leonard Walton, Blackpool, England

Application June 5, 1940, Serial No. 338,923
In Great Britain May 11, 1939

15 Claims. (Cl. 312—35)

The invention relates to coin-freed amusement or vending machines of the kind comprising a tray which may rotate, or be rotatable, and upon which articles are displayed, and a dispensing device such as a pusher, grab or bucket which is adapted, upon or following insertion of a coin, to move or be moved relatively to the tray for the purpose of propelling or transporting articles on the tray towards or into a dispensing outlet.

An object of the present invention is generally to provide an improved form of driving means for such machines.

A more specific object of the invention is to provide driving mechanism which is so constructed that the movement of the dispensing device may be controlled at the will of the operator.

Another object of the invention is to provide an arrangement whereby the speed of movement of the dispensing device on its passage towards the dispensing outlet can also be controlled by the operator.

A further object of the invention is to provide as part of the mechanism a device adapted to serve the purpose not only of enabling the coin to be inserted in the machine, but also of enabling the operator subsequently to control the movement of the dispensing device towards the dispensing outlet.

A further object of the invention is to provide mechanism of such design that after insertion of the coin the operator is able to control the movement of the dispensing device over a part only of its path of travel towards the dispensing outlet.

A further object of the invention is to provide a timing mechanism whereby, should the operator stop the movement of the dispensing device for more than a specified period and thus unduly obstruct the use of the machine by other operators, the dispensing device will complete the remainder of its movement automatically, the operator thereby losing control over it.

A machine of the kind already referred to, which when constructed in accordance with the invention, includes mechanism broadly comprising a source of motive power, a mechanical clutch having a driving part connected to the source of motive power and a driven part from which the dispensing device is moved, the said parts being normally out of engagement with one another, means controlled by insertion of a coin for bringing the clutch parts into driving engagement and thus causing movement of the dispensing device, and means permitting the operator subsequently to disengage and engage the clutch parts for the purpose of stopping and starting the dispensing device during its passage towards the dispensing outlet.

In order that the invention may be more clearly understood and readily carried into effect, it will now be more fully described with reference to the accompanying drawings. In the drawings Figures 1 to 3 are different views of the complete machine including the driving and control mechanism, while the remaining figures are confined to the illustration of the driving and control mechanism, which, in the embodiment to be described, includes a coin slide, a friction clutch and timing mechanism.

Figure 1:
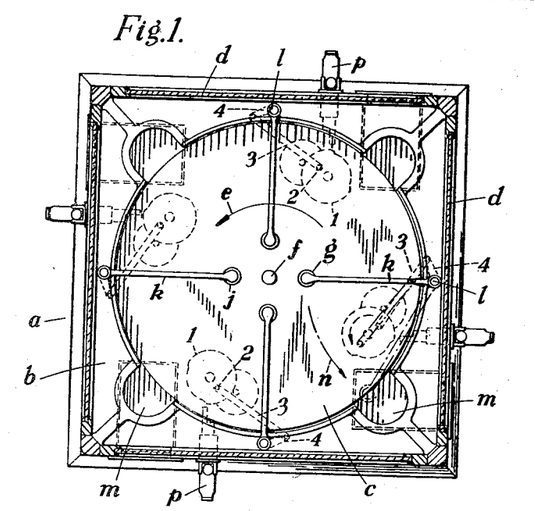
Figure 1 is a sectional plan view of the complete machine on the line I—I of Figure 3.
Figure 2:
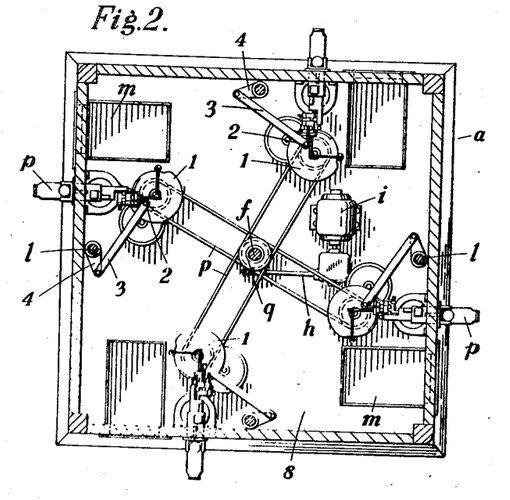
Figure 2 is a similar view on the line 2—2 of Figure 3.
Figure 3:
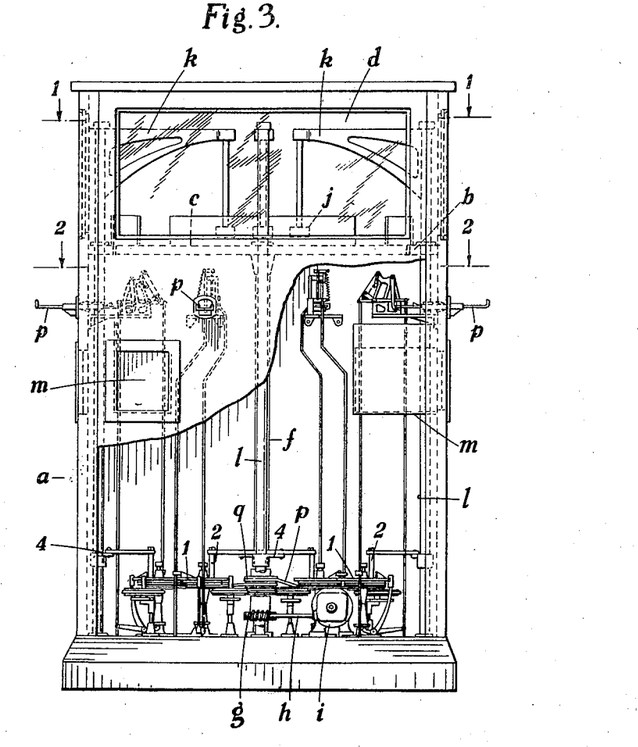
Figure 3 is an elevation of the complete machine, a part of the casing of the machine being broken away to illustrate more clearly the arrangement of the internal mechanism.

Referring first to Figures 1 to 3, the coin-freed amusement or vending machine illustrated is, in this instance, adapted for use by any number of operators up to four. It comprises a cabinet $a$ having at its upper part a compartment formed by a horizontal partition $b$. The partition has a circular aperture accommodating a circular tray $c$ upon which articles are displayed and which can be viewed through side windows d. The tray is adapted to be rotated continuously in the direction of the arrow e (Figure 1) and for this purpose it is carried upon a centrally disposed vertical spindle f which is mounted in a bearing in the base 8 of the cabinet and is provided with a worm wheel g driven by a worm on a shaft h connected to an electric motor i.

Four dispensing devices are provided, each consisting of a pusher j resting upon or lying in close proximity to the surface of the tray c and suspended from a boom k which lies a sufficient distance above the tray as not to contact with the articles thereon and which is carried upon a vertically disposed rotatable shaft l so that it can swing towards a dispensing outlet m, as indicated by the arrow n and the dotted lines at the right-hand bottom corner of Figure 1. The articles on the tray c are restrained against being pushed off the tray except by way of the dispensing outlets m, by means of guard plates o arranged on the partition b at the periphery of the tray.

A coin-slide p is provided in respect of each dispensing device and means are associated with the coin slide for moving the dispensing device towards the dispensing outlet and back again, such means including, as hereinafter more fully described, control mechanism comprising a friction clutch which has a rotatable driven disc 1 carrying a crank-pin 2 connected by a rod 3 to a lever 4 on the pivot shaft l of the boom k. It will be seen that a complete revolution of the disc 1 will cause the dispensing device to move from its initial position (shown in full lines in Figures 1 and 2) towards the dispensing outlet (as shown in dotted lines in Figure 1) and back again. The rod 3 may incorporate means, such as a spring (not shown) whereby, should the dispensing device, during its movement become jammed by contact with articles on the tray, the disc 1 can continue its rotation without causing a breakage or a straining of the parts.

Referring now more particularly to Figures 4 to 11, the aforementioned driven disc 1 of the clutch, with its crank-pin 2, is mounted for rotation on a shaft 5 which is supported in a boss 6 on a plate 7 secured to the base 8 or other convenient part of the cabinet a. This disc is normally stationary and is restrained against unintentional rotation by a spring 9 which surrounds the shaft 5 and acts between a collar 10 on the shaft and a bush 11 on the disc to press the disc against a shoulder 12 on the shaft (see Figure 8), thereby setting up a certain amount of friction between the two parts. The degree of pressure exercised by the spring can be varied by adjusting the position of the collar 10 on the shaft, the collar being held in the desired position by means of a set-screw 10a. The spring serves a second, and, in certain circumstances, a third function which will be explained later.

The driving disc 13 of the clutch is also mounted for rotation on the shaft 5 and is free to be moved axially on the shaft so as to be brought into or out of driving engagement with the driven disc 1. Normally, the driving disc, under the action of gravity, is out of driving engagement with the driven disc, the distance by which they are separated being determined by a bush 14 on the driving disc resting on a thrust-collar 15 which is also axially slidable on the shaft 5 and in turn rests upon the boss 6 of the plate 7. A friction insert 16 of cork or other suitable material may be provided between the two discs to prevent slippage when they are in definite driving engagement. During the time that the machine is in a condition to be operated, and while it is in operation, the driving disc 13 is constantly rotated. For this purpose the disk 13 is provided with a grooved pulley 17 around which passes, as shown in Figures 2 and 3, a belt p which in turn passes around a pulley q fast on the spindle f upon which the rotatable tray c is mounted. It will be understood that by this arrangement the single motor i is sufficient to drive the entire machine including the four control mechanisms, one of which is now in process of being described.

For moving the driving disc 13 axially into engagement with the driven disc 1, use is made of a clutch-actuating lever 18 fulcrumed on a pivot 19 secured to a lug 20 on the plate 7 and having two arms 18a and 18b of which the arm 18b engages beneath the thrust collar 15 while the other arm 18a is pivotally connected to the lower end of an upwardly extending rod 21. A rocking beam 22, having two arms 22a and 22b, is fulcrumed on a pivot 23 provided on a frame 24 which is carried by a bracket 25 secured to the inside of the wall 26 or other convenient part of the cabinet a. The arm 22a of the rocking beam extends forwardly towards the inner end 27 of the coin slide p (hereinafter more fully described) but normally lies out of the path of movement thereof, and is pivotally connected to the upper end of the rod 21. The other arm 22b of the rocking beam extends rearwardly and is connected by a pin 28 thereon to one end of a helical spring 29 the other end of which is connected by a pin 30 to the rearwardly extending arm 31a of a bell-crank lever 31 which is fulcrumed on a pivot 32 carried by the frame 24. The other arm 31b of the bell-crank lever extends downwardly into the path of travel of the coin slide. The spring is preferably always under tension, and the extent to which it tends to draw towards one another the two arms 22b and 31a is limited by a suitable stop, such as a plate 33 pivoted to the arm 31a and having a slot 34 through which extends the pin 28 on the other arm 22b.

Means are provided to retain the downwardly extending arm 31b of the bell-crank lever 31 and the forwardly extending arm 22a of the rocking beam 22 in their initial positions (shown in Figures 4 and 5) ready for actuation. Such means consist of a counterpoise spring 35 anchored at one end to the frame 24 or to a part fixed thereon such as the pivot 23, and secured at the other end to the rearwardly extending arm 31a of the bell-crank lever 31. This spring is under sufficient tension normally to counterbalance any tendency for the forwardly extending arm 22a of the rocking beam 22 to descend into the path of movement of the coin slide under the action of gravity, and hence, through the other connections in the lever system, unintentionally to move the downwardly projecting arm 31b of the bell-crank lever 31 rearwardly.

Figure 12:
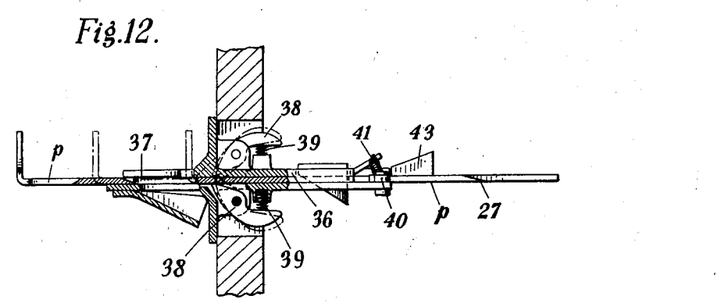
Figure 12 is a longitudinal section of the coin slide in its initial position.
Figure 13:
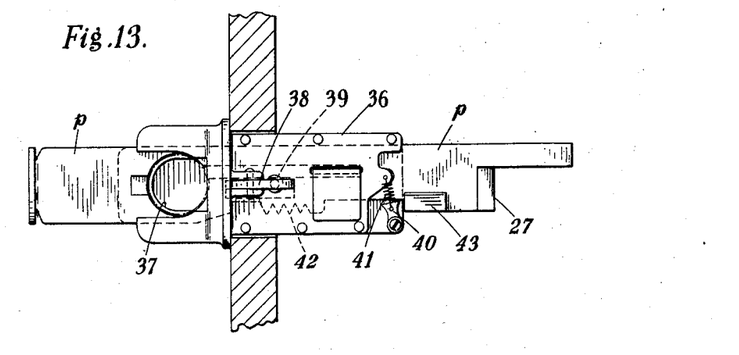
Figure 13 is a plan view of the coin slide in the same position.
Figure 14:
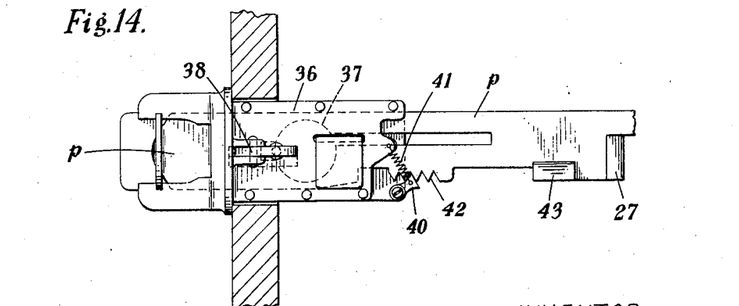
Figure 14 is a view similar to Figure 13, but showing the coin slide in a different position.

It is now convenient to describe more fully the coin slide p which is illustrated in detail in Figures 12 to 14. The coin slide is mounted in a guide 36 carried by the wall 26 of the cabinet a and passes from the outside to the inside of the cabinet, being movable inwardly and outwardly by the operator. The slide is provided with a coin slot 37 which, in the normal position of the slide, is accessible from the outside of the cabinet. The slide is also associated with means preventing it from being pushed inwardly to such an extent as to actuate the downwardly extending arm 31b of the bell-crank lever 31 unless a coin is present in the slot 37. To this end the guide 36 carries two pivoted pawls or detents 38 arranged one on either side of the slide p and the operative points of which are urged towards one another by means of springs 39. When the slide is in its fully withdrawn position, the operative points of the pawls 38 bear upon the upper and lower surfaces of the slide. When the slide is pushed inwardly without a coin of the proper diameter and thickness being present in the slot 37, the operative points of the pawls will, under the action of the springs 39, come together through the opening provided by the said slot. Under these conditions, further inward movement of the slide will bring the edge of the coin slot nearest the outer end of the slide, into contact with the operative ends of the pawls which will then act as stops preventing any more inward movement being imparted to the slide. When, however, a coin of the requisite denomination is inserted in the slot 37 it will in effect deprive the coin slide of the interruption otherwise constituted by the slot. In these circumstances the operative ends of the pawls 38 will be maintained separated while the slide is being pushed inwardly and thus will offer no obstruction to inward movement of the slide to its fullest extent. The full inward movement of the slide will bring the coin inside the cabinet into which it will fall, the coin being if desired collected in a suitable receptacle (not shown). It will be noted that the pawls 38 are so positioned relatively to the coin slot when the slide is in its fully withdrawn position, that even when a coin is absent from the slot they cannot prevent a certain amount of inward movement of the slide. This free inward movement is not enough to cause actuation of the downwardly extending arm 31b of the bell-crank lever 31, but the said inward movement, together with the corresponding return movement, is necessary as it serves a purpose which will be hereinafter described.

The coin slide, further, is associated with means which, when a coin is present in the slot 37, compel the operator to move the slide inwardly to its fullest extent, thereby to release the coin inside the cabinet and fully to actuate the downwardly extending arm 31b, before the slide can be withdrawn again. Such means consist of a double-acting pawl 40 which is pivoted to the guide 36, and the operative end of which is urged by a spring 41 into the path of a group of ratchet teeth 42 extending laterally from one of the longitudinal edges of the coin slide. The group of ratchet teeth are so positioned that when the slide is in its fully withdrawn position the pawl 40 is idle and remains idle while the slide is pushed inwardly to an extent representing its free movement previously referred to, that is to say, the proportion of its full inward movement not dependent upon the presence of a coin in the slot 37. It follows, of course, that the pawl also remains idle during the corresponding return movement. When, however, the slide is in the process of being pushed inwardly to its fullest extent after a coin has been placed in the coin slot, the inner end of the group of ratchet teeth 42 will come into contact with the pawl and the latter will be deflected to the right as shown in Figure 14 and engage with the ratchet teeth in the manner also shown in that figure. It will be seen that while in such engagement, the pawl will not hinder further inward movement of the coin slide but will prevent any return movement. The group of ratchet teeth is of such length that these teeth do not become free of the influence of the pawl until the slide has reached the end of its full inward movement. When a return movement is imparted to the slide the outer end of the group of ratchet teeth 42 will come into contact with the pawl 40 and deflect it to the left, whereafter the pawl will engage with the ratchet teeth in the opposite direction to that shown in Figure 14. In this way the pawl will not prevent further outward movement of the coin slide, but will act to prevent any attempt being made to push the slide in again while the pawl is in engagement with the ratchet teeth. As soon as the slide has been withdrawn to such an extent that it reaches the free movement position previously described, the pawl will become inoperative.

Figure 6:
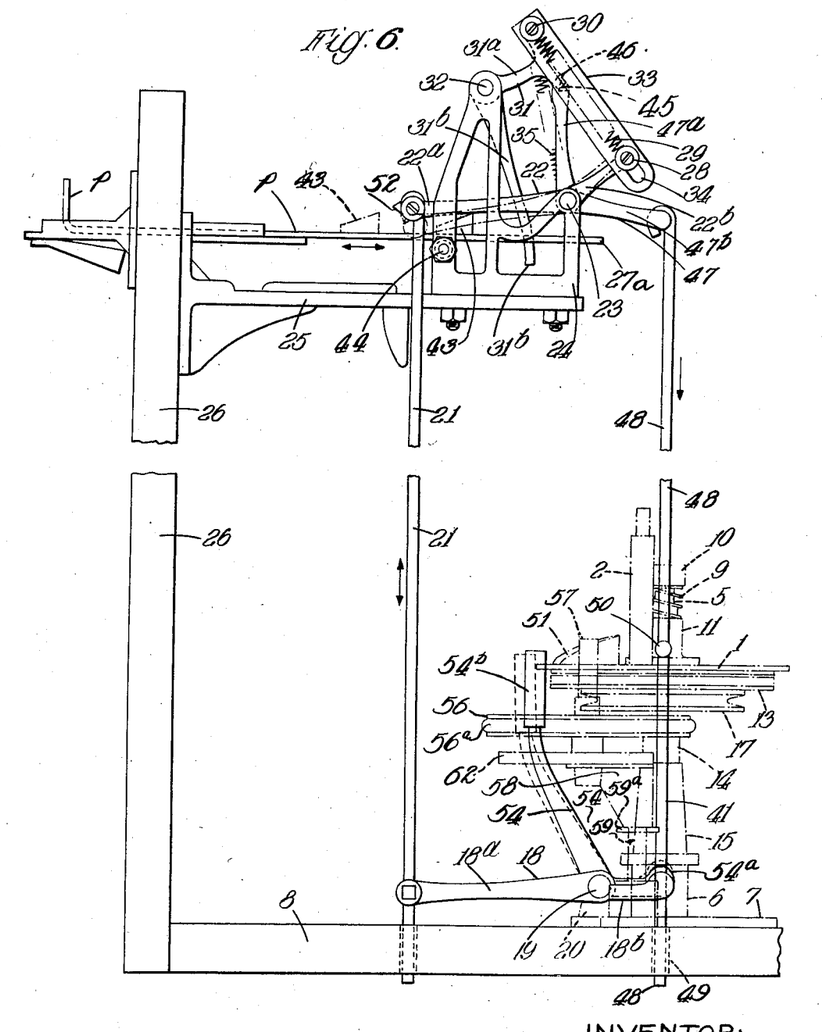
Figure 6 is a view similar to Figure 4 but indicating a different position of the parts.
Figure 7:
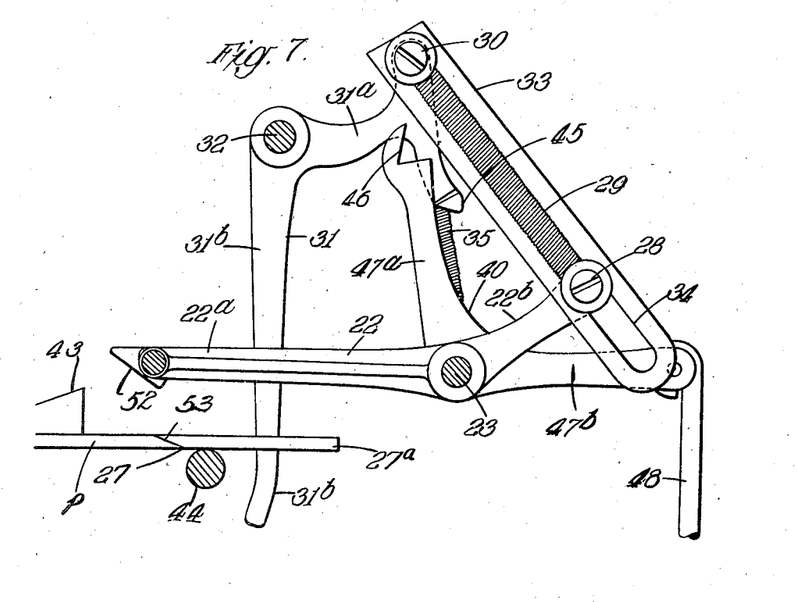
Figure 7 is a vertical section approximately on the line 7—7 of Figure 5 and to a larger scale.
Figure 8:
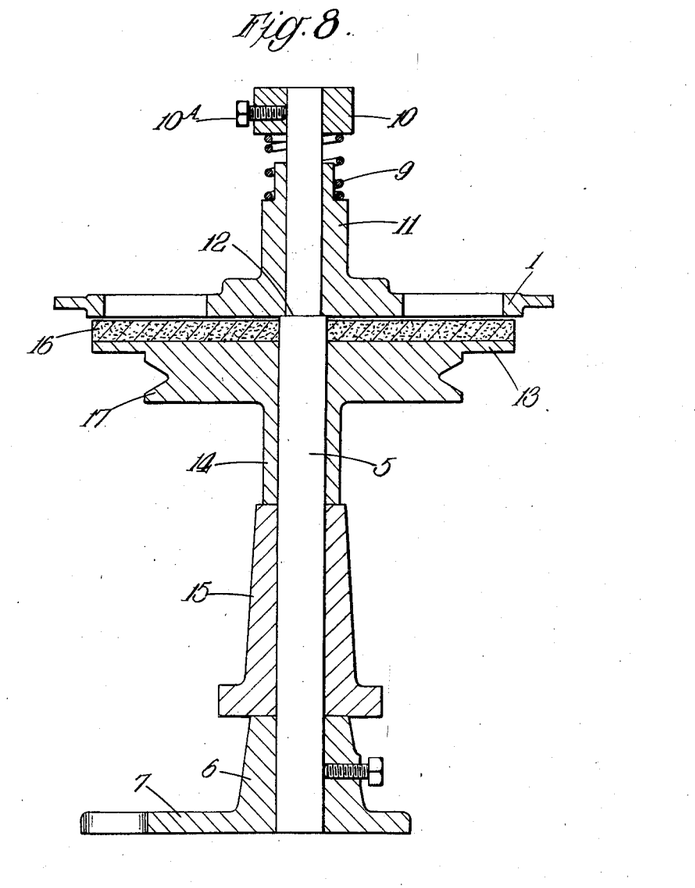
Figure 8 is a vertical section through the clutch.

On insertion of a coin in the coin slide p and the pressing-in of the latter, the inner end 27 of the slide will come into contact with the downwardly extending arm 31b of the bell-crank lever 31, and further inward movement of the slide will cause this arm to swing rearwardly, hence swinging upwardly the rearwardly extending arm 31a of the said lever as depicted in Figure 6. Such upward movement will, by virtue of the connection provided by the spring 29 with the rear arm 22b of the rocking beam 22, tend to cause the forwardly extending arm 22a of the beam to move downwardly, thus moving the connecting rod 21, clutch-actuating lever 18 and thrust collar 15 to lift the driving disc 13 of the clutch into engagement with the driven disc 1. Such downward movement of the forwardly extending arm of the rocking beam is, however, temporarily restrained by the provision of a stop 43 which projects from the surface of the coin slide and engages beneath the forwardly extending arm of the rocking beam while the coin slide is acting upon the arm 31b of the bell-crank lever (see Figure 6). The object of this arrangement is to prevent the clutch being engaged before the coin slide has completed its inward movement to release the coin inside the machine, and has been withdrawn again more or less to its initial position. A restraining of the downward movement of the forwardly extending arm of the rocking beam 22 will not, however, prevent the downwardly extending arm of the bell-crank lever 31 being swung backwards to its fullest extent by the coin slide, since the spring 29 connecting the arm 22b of the beam to the arm 31a of the bell-crank lever will permit of such movement, the result being that the spring is loaded by the application of additional tension thereto.

It is preferred to provide laterally of the inner end 27 of the coin slide a rearward extension 27a which rests on a finger 44 extending from the frame 24 to provide support for the inner portion of the slide.

When the downwardly extending arm 31b of the bell-crank lever 31 has been swung back to its fullest extent by the inward movement of the coin slide and hence the rearwardly extending arm 31a of the said crank lever has been correspondingly raised, a tooth 45 on this latter arm engages with a recess 46 in one arm 47a of a double-armed trip lever 47 which is fulcrumed on the pivot 23 on the frame 24. By reason of such engagement the bell-crank lever will remain in the position to which it has been deflected by the coin slide. The other arm 47b of the trip lever is pivotally connected to a downwardly extending rod 48 guided in a hole 49 in the base 8 and provided with a finger or projection 50 which normally lies above the path of a cam 51 projecting upwardly from the face of the driven disc 1 of the clutch, but which descends into the path of the said cam when the recess 46 in the arm 47a of the trip lever engages with the tooth 45 on the rearwardly extending arm of the bell-crank lever 31. It will be understood that this engagement is brought about by the weight of the rod 48 tending to press the arm 47a of the trip lever always against the tooth 45. A suitable spring may however, be incorporated to ensure such engagement at the appropriate time. The finger or projection 50 on the rod 48 may be so mounted as to be vertically adjustable for obvious reasons.

Figure 4:
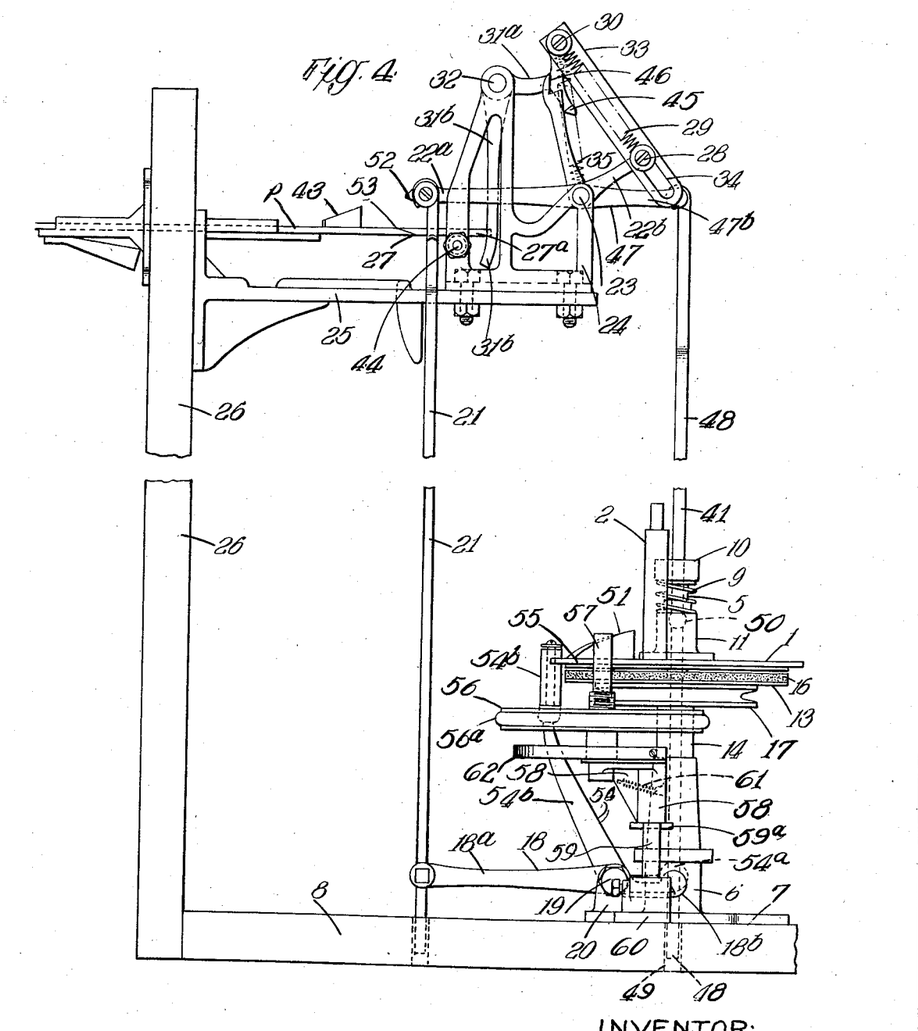
Figure 4 is a side elevation of the driving and control mechanism with the parts in their initial position.
Figure 5:
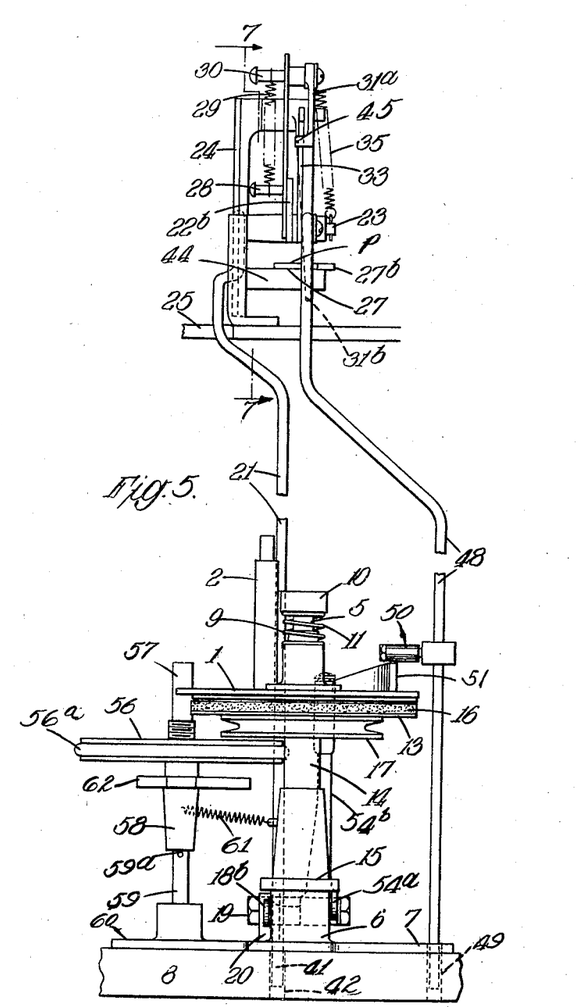
Figure 5 is an end view corresponding to Figure 4.
Figures 9, 10:
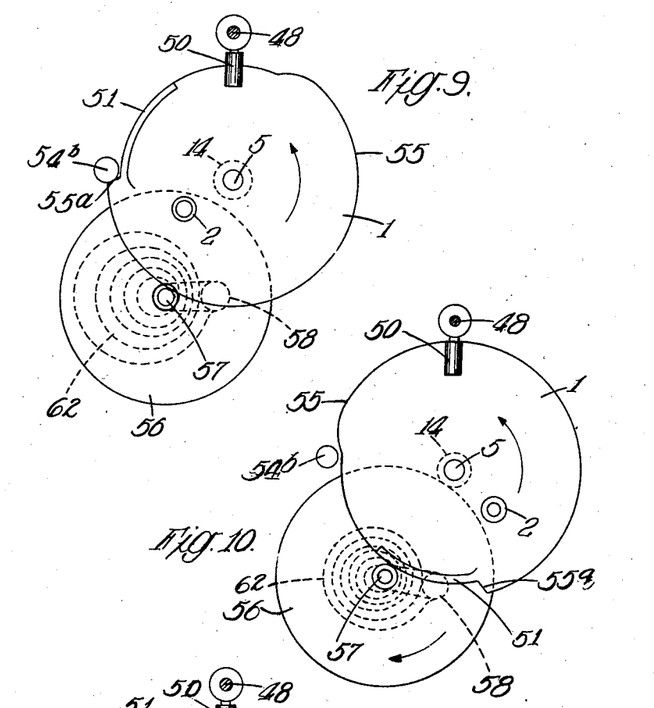
Figures 9, 10 and 11 are plan views of part of the clutch and timing mechanism, indicating the positions they assume during different phases of the operation.

Initially the clutch discs are out of engagement, the driving disc 13 being under free continuous rotation on the shaft 5, while the driven disc 1 is so situated angularly that the vertical cam 51 is in the position indicated in Figures 4, 5 and 6 and more particularly in Figure 9. After the coin slide has been operated to set the lever system as described above and has been withdrawn to such an extent that the stop 43 thereon no longer engages with the forwardly extending arm 22a of the rocking beam 22, this arm will descend under the influence of the energy stored up in the spring 29 and will thus transmit a movement to the clutch-actuating lever 18 through the rod 21, thereby causing the driving disc 13 of the clutch to move into driving engagement with the driven disc 1. The driven disc 1 with its crank-pin 2 will thereupon commence to rotate and hence, by means of the connecting rod 3 and lever 4 (Figures 1, 2 and 3), cause the pusher j to commence to move from its initial position towards the dispensing outlet m.

The spring 9 on the clutch shaft 5, in addition to having the first function already referred to, of restraining the driven disc 1 of the clutch against unintentional rotation, has a second function, namely, it acts as a buffer which absorbs shocks when the driving disc 13 is raised into engagement with the driven disc under the sudden action of the spring 29. The buffer spring 9 moreover, by allowing the driven disc 1 to "give" under the pressure of the driving disc 13, permits of a certain amount of tolerance in the dimensioning and assembling of the clutch-actuating mechanism, while still ensuring that the clutch will be fully engaged at the appropriate time.

To enable the operator to move the driving disc 13 of the clutch into and out of engagement with the driven disc after the former has first been engaged in the manner described above, the forwardly extending arm 22a of the rocking beam 22 is provided with a cam surface 52 which, in the descended position of this arm, lies in the path of a corresponding cam surface 53 at the inner end of the coin slide. By making use of the available free movement of the coin slide to which reference has already been made, the two cam surfaces can be brought into and out of engagement, and when engaged the forwardly extending arm of the rocking beam will be raised against the pull of the connecting spring 29, thus moving the clutch-actuating lever 18 in a direction to release the clutch, disengagement of the cam surfaces 52 and 53 causing engagement of the clutch again. The amount of free movement permitted to the coin slide is approximately that existing between its full outward position and the point where the vertical face of the stop 43 thereon comes into contact with the end of the arm 22a of the rocking lever 22 when the said arm is in its descended position.

It will be seen that by careful manipulation of the coin slide a certain amount of slippage may be caused to occur between the clutch discs whereby the speed of movement of the dispensing device towards the dispensing outlet may be controlled by the operator.

In the normal position of the mechanism as illustrated in Figures 4 and 5 the cam 51 on the face of the driven disc 1 of the clutch is so situated that it does not contact with the finger 50 on the rod 48 connected to the trip lever 47, until the disc has nearly completed one revolution, during which time the pusher j has been moved towards the dispensing outlet m and back again towards its initial position. Figure 9 shows the initial angular position of the cam 51 and it will be seen that in this position the cam lies forward of the finger 50, in the direction of rotation of the disc indicated by the arrow.

Figure 11:
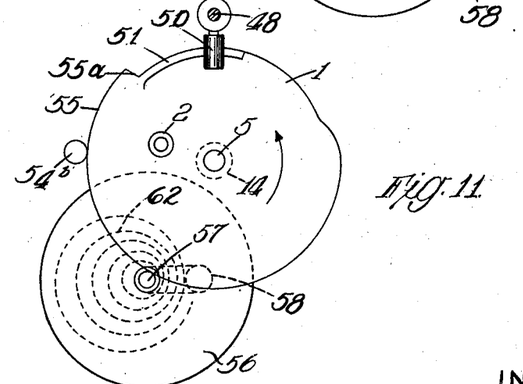

Figure 10 indicates an intermediate angular position of the cam 51, while Figure 11 indicates the angular position of the cam a little before the disc 1 has completed one revolution, with the cam 51 engaging beneath and lifting the finger 50. Further rotation of the disc towards a completion of the revolution will cause the cam 51 to raise the finger 50 and hence the rod 48, to its fullest extent, thereby actuating the trip lever 47 to cause the recess 46 in the arm 47a thereof to move out of engagement with the tooth 45 on the bell-crank lever 31. The energy stored up in the connecting spring 29 will thereupon act to restore the lever system associated with the coin slide, to its original position. Such restoration will cause the driving disc of the clutch to descend out of engagement with the driven disc which will thereby cease to rotate. At the same time the cam 51 on the driven disc of the clutch will have passed the finger 50, thereby permitting the rod 48 to descend and place the finger again in the path of the cam 51. The various parts will thus be placed in their initial condition, ready for further actuation through the medium of the coin slide after insertion of another coin. Actually in order to ensure that the cam 51, having acted to restore the lever system and hence the driving disc of the clutch to their original inoperative positions, shall itself return fully to its initial angular position, it may be desirable to have a slight time lag between restoration of the lever system and disengagement of the clutch. For this purpose the clutch-actuating lever 18 may be so dimensioned, or its connection to the rod 21 so adjusted, as to impart to the driving disc of the clutch an upward movement which is a little more than that required to cause this disc to come into driving engagement with the driven disc, this extra movement being absorbed by the buffer spring 9. It will be appreciated that under these conditions, when the lever system has been restored to its original position, the driving disc of the clutch will remain in engagement with the driven disc for a period which, although brief, is sufficient to ensure that the driven disc has made an absolutely complete revolution before it stops rotating and hence has carried the cam 51 to its original position beyond the finger 50. This explains the third function of the buffer spring 9.

With the arrangement so far described the operator will have control over the pusher j not only during its movement towards the dispensing outlet, but also during its return movement. It is desirable, however, that provision should be made whereby the operator shall have control over the pusher only during its movement towards the dispensing outlet or during a part of that movement, the remainder of the movement taking place automatically. To this end, auxiliary clutch-actuating means, not under the control of the operator, are provided, such means coming into action automatically to hold the clutch in engagement at a suitable time before the driven disc of the clutch has completed a full revolution and to retain the clutch in engagement until the cycle is completed. Such means may comprise, as illustrated in the drawings, an auxiliary clutch-actuating lever 54 fulcrumed on the pivot 19 and having two arms, of which the arm 54a is adapted to engage with the thrust collar 15 for the purpose of pressing the driving disc 13 of the clutch into driving engagement with the driven disc 1, while the other arm 54b lies in the path of a cam 55 extending radially from the periphery of the driven disc (see more particularly Figures 9 to 11). This cam is so set that when the driven disc 1 has completed only a part of its revolution, the cam engages with the arm 54b of the auxiliary clutch-actuating lever 54 to cause the other arm 54a thereof to lift the thrust collar 15 and hence the driving disc 13 of the clutch into driving engagement with the driven disc 1, the cam being of a length sufficient to retain the clutch in engagement until the driven disc has made a complete revolution and therefore has returned the dispensing device to its initial position. It is preferred that the cam shall be so disposed that it comes into play before the pusher j has reached the end of its movement towards the dispensing outlet, thus depriving the operator of control over the movement of the pusher at this stage, and subsequently. It is disposed in this way in the embodiment illustrated, Figure 10 showing that the cam is about to contact with the arm 54b of the auxiliary clutch-actuating lever 54 when the disc 1 has completed about one-third of a revolution.

Where auxiliary clutch-actuating means as just described, are provided, it may not be necessary for the buffer spring 9 to have the third function already mentioned, because the peripheral cam 48 can be made of such length that its end 55a (Figures 9, 10 and 11) releases the auxiliary clutch-actuating lever 54 only at the instant that the cam 51 on the face of the driven disc 1 has returned to its original angular position beyond the finger 50.

The mechanism illustrated includes a timing device serving to deprive the operator of control over the movement of the dispensing device should he stop the movement of the dispensing device for more than a specified period during the control phase. For this purpose a timing wheel 56 is mounted for rotation in the manner of a nut upon a vertically disposed screw-threaded spindle 57 so that when the wheel is rotated it will move along the spindle upwardly or downwardly according to the direction of rotation. The spindle is positioned laterally of the driven disc of the clutch, being carried by a crank 58 which is pivotally supported by means of a pin 59a on a shaft 59 carried by the plate 7 or by a separate plate 60 secured to the base 8. A tension spring 61 anchored on the one hand to the crank 58 and on the other hand to a relatively fixed part such as the thrust collar 15 tends to swing the crank, and hence the wheel 56 and spindle 57, towards the axis of the clutch. The spindle 57 is of such length that it is capable of bearing on the peripheral cam 48 on the driven disc 1 under the action of the spring 61. The timing wheel 56 is situated below the pulley 17 of the driving disc 13 of the clutch and is of such diameter that when the spindle 57 is not engaged by the peripheral cam 55, the edge of the wheel, which may be provided with a friction band 56a of rubber or other suitable material, bears upon the bush 14 of the driving disc. This position is clearly indicated in Figure 10. Under these conditions the rotation of the driving disc will cause rotation of the timing wheel in one direction and such rotation will result in the wheel moving along the spindle 57. As, in the embodiment illustrated, the driving disc of the clutch rotates anti-clockwise (looking downwards) and the screw-thread on the spindle 57 is left-handed, rotation of the timing wheel through the driving disc will cause the wheel to move upwardly towards the pulley 17. By a sufficient rotation of the timing wheel the axial upward movement thereof will be of such magnitude as to cause the upper surface of the wheel to engage with the under-surface of the pulley 17 which forms part of the driving disc of the clutch, thus pressing the driving disc upwardly into contact with the driven disc, whereby the clutch will be engaged. Such rotation of the wheel takes place against the action of a suitable spring, such as a clock spring 62, one end of which is anchored to the timing wheel 56 and the other end to the crank 58. When the mechanism is in its initial position, the spindle 57 engages with the peripheral cam 55 on the driven disc 1, and the edge of the timing wheel 56 is therefore held out of contact with the bush 14, as shown in Figure 9. When the driven disc has been rotated to an extent represented by the distance between the end 55a of the cam 55 and the spindle 57, the spindle will no longer be under the influence of the cam and hence the spring 61 will act to draw the edge of the timing wheel into driving engagement with the bush 14, thereby causing the wheel to rotate and the clock spring 62 to be wound up. Such rotation of the wheel will result in it moving upwardly on the spindle 57 until, if rotated sufficiently, it eventually comes into engagement with the under surface of the pulley 17, thereby lifting the driving disc of the clutch into driving engagement with the driven disc 1 to cause the latter disc to be rotated. In this way, should the operator, during the control phase, so manipulate the coin slide as to leave the clutch, and consequently the dispensing device, out of operation for a period longer than that taken by the timing wheel itself to engage the clutch, he will lose control over the clutch as the latter will be engaged automatically to compel the dispensing device to continue its movement again. When, by virtue of such automatic engagement of the clutch, the driven disc 1 has been rotated to such an extent that the peripheral cam 55 thereon has again come into engagement with the spindle 57, the edge of the timing wheel 56 will be forced out of engagement with the bush 14 and the energy stored up in the clock spring 62 will cause the wheel to rotate in the opposite direction, thereby restoring it to its original vertical position on the spindle where its upper surface will no longer be in contact with the under surface of the pulley 17. It will be understood that by the time such restoration has taken place, the auxiliary clutch-actuating lever 54 has already been moved by the peripheral cam into the clutch-engaging position so that the operator, having once lost control of the clutch through the intervention of the timing wheel, cannot regain it.

The instant at which the timing wheel 56 commences to rotate will, of course, depend upon the length of the peripheral cam 55 and the location of the end 55a thereof, while the time taken by the timing wheel to cause automatic engagement of the clutch, to thereby deprive the operator of control, will depend upon the amount of clearance between the upper face of the wheel and the under face of the pulley 17 when the wheel is in its lowermost position on the spindle 57. This clearance may be varied by providing for a vertical adjustment of the shaft 59 on the plate 60 which carries it.

What I claim and desire to secure by Letters Patent of the United States is:

1. A coin-freed amusement or vending machine comprising a tray upon which articles are displayed, means for rotating the tray continuously when the machine is in operation, a dispensing device movable relatively to the tray while the latter is rotating for the purpose of moving articles on the tray towards a dispensing outlet, a mechanical clutch having a driving part connected to a source of motive power and a driven part from which the dispensing device is moved, the said parts being normally out of engagement with one another, manually operable means for actuating the clutch parts to bring them into driving engagement and thus cause movement of the dispensing device towards the dispensing outlet and to permit the operator subsequently to disengage and engage the clutch parts for the purpose of stopping and starting the dispensing device on its passage towards the dispensing outlet.

2. A machine according to claim 1, wherein the driven part of the clutch consists of a normally stationary disc connected to the dispensing device in such manner that a complete revolution of the disc causes the dispensing device to move from its initial position, towards the dispensing outlet and back again, while the driving part consists of a disc adapted to be constantly rotated and to be brought into engagement with the driven disc.

3. A machine according to claim 1, wherein the manually operable means comprise a rocking beam, a clutch actuating lever connected to one of two arms of said rocking beam, the said arm extending forwardly towards the inner end of a coin slide but normally lying out of the path of movement thereof.

4. A machine according to claim 1, wherein the manually operable means comprise a rocking beam, a pivoted bell crank lever, a clutch actuating lever connected to one of two arms of said rocking beam, said arm extending forwardly towards the inner end of a coin slide but normally lying out of the path of movement thereof, while the other arm of the rocking beam extends rearwardly and is connected by a spring to a rearwardly extending arm of the pivoted bell-crank lever, the other arm of which lever extends downwardly into the path of travel of the coin slide.

5. A machine according to claim 1, wherein the manually operable means comprise a rocking beam, a pivoted bell crank lever, a stop, a clutch actuating lever connected to one of two arms of said rocking beam, said arm extending forwardly towards the inner end of a coin slide but normally lying outside the path of movement thereof, the other arm of the rocking beam extending rearwardly and being connected by a spring to a rearwardly extending arm of the pivoted bell-crank lever, the other arm of which lever extends downwardly into the path of travel of the coin slide by which it is adapted to be swung rearwardly, and wherein the spring is always under tension and the extent to which said spring draws the rearwardly extending arm of the rocking beam and the rearwardly extending arm of the bell-crank lever towards one another is limited by said stop.

6. A machine according to claim 1, wherein the manually operable means comprise a rocking beam, a pivoted bell crank lever, a clutch actuating lever connected to one of two arms of said rocking beam, said arm extending forwardly towards the inner end of a coin slide but normally lying outside the path of movement thereof, the other arm of the rocking beam extending rearwardly and being connected by a spring to a rearwardly extending arm of said pivoted bell-crank lever, the other arm of which lever extends downwardly into the path of travel of the coin slide, and wherein means are provided tending to retain the downwardly extending arm of the bell-crank lever in its initial position.

7. A machine according to claim 1, wherein the manually operable means comprise a rocking beam, a pivoted bell crank lever, a two-armed pivoted trip lever, a clutch actuating lever connected to one of two arms of said rocking beam, said arm extending forwardly towards the inner end of a coin slide but normally lying out of the path of movement thereof, the other arm of the rocking beam extending rearwardly and being connected by a spring to the rearwardly extending arm of said pivoted bell-crank lever, the other arm of which lever extends downwardly into the path of travel of the coin slide, there being provided a recess in the rearwardly extending arm of said bell-crank lever, and the two-armed pivoted trip lever having on one arm thereof a tooth adapted to engage in said recess when the downwardly extending arm of the bell-crank lever has been moved rearwardly.

8. A machine according to claim 1, wherein the clutch comprises a normally stationary driven disc and a driving disc adapted to be constantly rotated, and wherein said manually operable means comprise a rocking beam, a pivoted bell crank lever, a two-armed pivoted trip lever, a rod, a clutch actuating lever connected to one of two arms of said rocking beam, said arm extending forwardly towards the inner end of a coin slide but normally lying out of the path of movement thereof, the other arm of the rocking beam extending rearwardly and being connected by a spring to the rearwardly extending arm of said pivoted bell-crank lever, the other arm of which lever extends downwardly into the path of travel of the coin slide, a recess in the rearwardly extending arm of said bell-crank lever, and said two-armed pivoted trip lever having on one arm thereof a tooth adapted to engage in said recess when the downwardly extending arm of the bell-crank lever has been moved rearwardly, the other arm of said trip lever being connected to aforesaid rod, this rod having a finger normally lying outside the path of travel of a cam portion projecting from the surface of the driven disc of the clutch.

9. A machine according to claim 1, wherein the manually operable means comprise a rocking beam, a stop, a pivoted bell crank lever, a clutch actuating lever connected to one of two arms of said rocking beam, said arm extending forwardly towards the inner end of a coin slide but normally lying out of the path of movement of the slide, while the other arm of the rocking beam extends rearwardly and is connected by a spring to the rearwardly extending arm of said pivoted bell-crank lever, the other arm of which lever extends downwardly into the path of travel of the coin slide, and wherein said stop is movably mounted and adapted to engage beneath the forwardly extending arm of the rocking beam.

10. A machine according to claim 1, wherein the manually operable means comprise a rocking beam, a stop, a pivoted bell crank lever, a cam portion, a cam, a clutch actuating lever connected to one of two arms of said rocking beam, said arm extending forwardly towards the inner end of a coin slide but normally lying out of the path of movement of the slide, while the other arm of the rocking beam extends rearwardly and is connected by a spring to the rearwardly extending arm of said pivoted bell-crank lever, the other arm of which lever extends downwardly into the path of travel of the coin slide, the stop being movably mounted and adapted to engage beneath the forwardly extending arm of the rocking beam, the cam portion being mounted to be movable with said stop, the cam being mounted on the forwardly extending arm of the rocking beam, and said cam and cam portion being adapted for engagement with and disengagement from one another for the purpose of rocking said beam and thereby cause disengagement and engagement of the clutch.

11. A machine according to claim 1, wherein the normally stationary disc of the clutch is pressed by a spring.

12. A machine according to claim 1, wherein the clutch comprises a normally stationary driven disc and a driving disc adapted to be constantly rotated, and wherein auxiliary clutch-actuating means are included, the said means comprising a cam and an auxiliary clutch actuating lever controlled by said cam which is mounted on the periphery of the driven disc of the clutch, the cam coming into action to operate the said lever before the said disc has completed one revolution.

13. A machine according to claim 1, wherein the clutch comprises a normally stationary driven disc and a driving disc co-axial with the stationary disc and adapted to be constantly rotated, the machine also including auxiliary clutch-actuating means comprising an auxiliary clutch-actuating lever controlled by a cam on the periphery of the driven disc of the clutch, said cam coming into action to operate said lever before said disc has completed one revolution, a timing device comprising a timing wheel mounted for rotation in the manner of a nut upon a screw-threaded spindle so as to move along the spindle for the purpose of engaging the clutch, said spindle being positioned laterally of the driven disc of the clutch and being carried by a crank which is urged towards the axis of the clutch, and means for causing the spindle to bear upon the peripheral cam on the driven disc of the clutch, the timing wheel being of such diameter that when the spindle is not engaged by the said cam the edge of the wheel will be in driving engagement with the driving disc of the clutch.

14. A machine according to claim 1, wherein the clutch comprises a normally stationary driven disc and a driving disc co-axial with the stationary disc and adapted to be constantly rotated, the machine also including auxiliary clutch-actuating means comprising an auxiliary clutch-actuating lever controlled by a cam on the periphery of the driven disc of the clutch, said cam coming into action to operate said lever before said disc has completed one revolution, a timing device comprising a timing wheel mounted for rotation in the manner of a nut upon a screw-threaded spindle so as to move along the spindle for the purpose of engaging the clutch, said spindle being positioned laterally of the driven disc of the clutch and being carried by a crank which is urged towards the axis of the clutch, and means for causing the spindle to bear upon the peripheral cam on the driven disc of the clutch, the timing wheel being of such diameter that when the spindle is not engaged by said cam, the edge of the wheel will be in driving engagement with the driving disc of the clutch, the timing wheel extending beneath the driving disc of the clutch so that when it is rotated therefrom it will engage with said disc to move the latter into engagement with the driven disc of the clutch.

15. A machine according to claim 1, wherein the clutch comprises a normally stationary driven disc and a driving disc co-axial with the stationary disc and adapted to be constantly rotated, the machine also including auxiliary clutch-actuating means comprising an auxiliary clutch-actuating lever controlled by a cam on the periphery of the driven disc of the clutch, said cam coming into action to operate said lever before said disc has completed one revolution, a timing device comprising a timing wheel mounted for rotation in the manner of a nut upon a screw-threaded spindle so as to move along the spindle for the purpose of engaging the clutch, said spindle being positioned laterally of the driven disc of the clutch and being carried by a crank which is urged towards the axis of the clutch, and means for causing the spindle to bear upon the peripheral cam on the driven disc of the clutch, the timing wheel being of such diameter that when the spindle is not engaged by said cam the edge of the wheel will be in driving engagement with the driving disc of the clutch, the timing wheel extending beneath the driving disc of the clutch so that when it is rotated therefrom it will engage with said disc to move the latter into engagement with the driven disc of the clutch, and a spring connected to the timing wheel and acting to restore the wheel to its original position on the spindle after it has been rotated.

ALFRED LEONARD WALTON.